J. C. COSS.
VEHICLE BOW SOCKET.
APPLICATION FILED JUNE 30, 1914.

1,141,527.

Patented June 1, 1915.

Witnesses
A. S. Schrader.
F. E. Adams.

Inventor
JAMES C. COSS.
By Obed C. Billman
Attorney

UNITED STATES PATENT OFFICE.

JAMES CHESTER COSS, OF DETROIT, MICHIGAN.

VEHICLE BOW-SOCKET.

1,141,527.  Specification of Letters Patent.  Patented June 1, 1915.

Application filed June 30, 1914. Serial No. 848,243.

*To all whom it may concern:*

Be it known that I, JAMES C. Coss, a citizen of the United States, residing at Detroit, in the county of Wayne and State of Michigan, have invented certain new and useful Improvements in Vehicle Bow-Sockets, of which the following is a specification.

My invention relates to improvements in vehicle bow sockets, and more particularly to improvements in tubular bow sockets for receiving and carrying the ends of the bows of tops, the present embodiment being particularly designed and adapted for use in connection with heavy vehicles, such as automobiles, or the like, where comparatively heavy tops are employed.

The primary object of the invention is to provide a generally improved tubular bow socket, the present embodiment being particularly designed and adapted for use in receiving and carrying the large bows in the socalled "one-man-top" now extensively employed in connection with automobiles and in which the top is fastened on the rear seat of the vehicle and extends forwardly and over the front seat of the vehicle, such structures particularly requiring tubular bow sockets of great strength and at the same time of light weight so that the tops may be easily handled and at the same time thoroughly braced by the tubular bow sockets while in use.

The present improvements are particularly directed to strengthening and reinforcing the bow receiving ends of the tubular bow sockets so that these ends which are subjected to the greatest lateral stresses may be given the requisite strength and lightness and particularly may be prevented from breaking or splitting at the lateral seams or joints in the operation of driving the tapered ends of the wooden top bows into such receiving ends of the bow sockets, as now frequently occurs with the ordinary form of tubular bow socket.

With the above mentioned and other ends in view, the invention consists in the novel construction, arrangement, and combination of parts, hereinafter described, illustrated in some of its embodiments in the accompanying drawings, and particularly pointed out in the appended claims.

Figure 1:
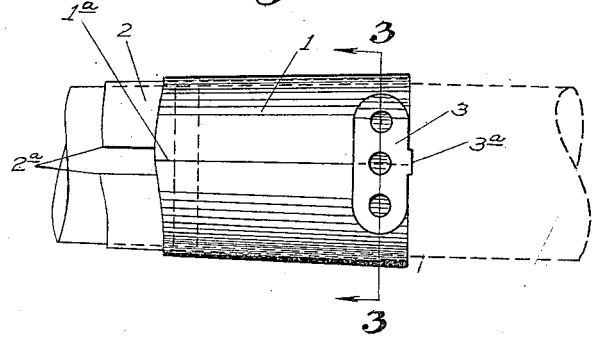
Figure 2:
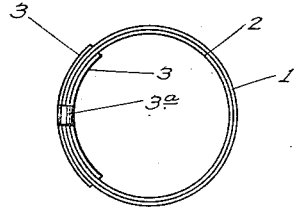
Figure 3:
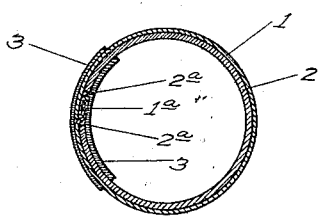
Figure 4:
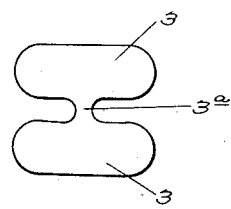
Figure 5:
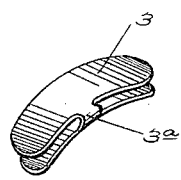
Figure 6:
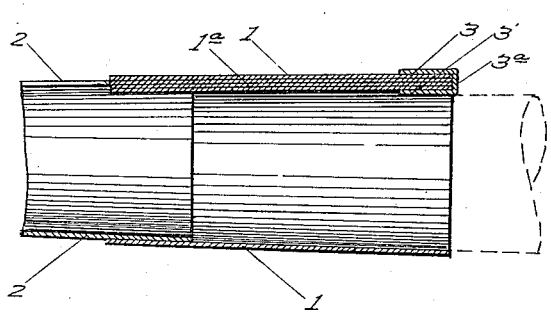
Figure 7:
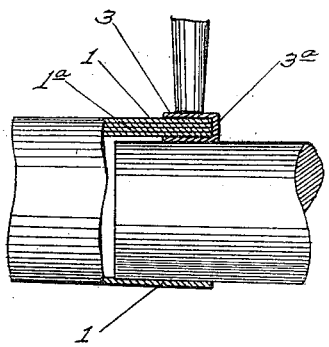

Referring to the drawings, forming a part of this specification, Figure 1, is a side elevation of the bow receiving end of a tubular bow socket constructed in accordance with my invention. Fig. 2, an end view of the same. Fig. 3, a cross sectional view taken on line 3—3 of Fig. 1. Fig. 4, a plan view of the blank for the particular form of reinforcing tie or bridge member employed at the bow receiving ends of the tubular bow sockets shown in the present embodiments of this invention. Fig. 5, a perspective view of the reinforcing or bridge members after being formed up and preparatory to being inserted over the jointed or seamed side of the tubular bow socket at the bow receiving end thereof preparatory to spot-welding or other suitable securing means. Fig. 6, a longitudinal sectional view of a slightly modified form of tubular bow socket in which the inner tube does not extend entirely to the end of the bow receiving end of the socket. Fig. 7, a view illustrating the manner of spot-welding the reinforcing or bridge member at the bow receiving end of the socket in connection with the electrodes of the welding apparatus.

Similar numerals of reference designate like parts throughout all the figures of the drawings.

The improved tubular bow socket may be of the usual construction comprising an outer tubular member 1, suitably formed and preferably tapered from top to bottom and an inner or reinforcing longitudinally split tubular member 2, said outer tubular member being provided along one side with a double seam or joint 1$^a$, commonly known as a "stove pipe lock" with the projecting seam or portion rolled to the inside as shown most clearly in Figs. 2, 3, and 6 of the drawings.

The inner or reinforcing tubular member 2, is of such form and dimensions that when inserted and driven into the outer tube 1, the side or longitudinally extending edges 2$^a$, will be spaced apart forming an intervening space or recess 2$^b$, to receive and contain the inwardly projecting portion of the double seam or joint 1$^a$, said edges 2$^a$, being adapted to impinge on each side upon the projecting joint 1$^a$, when the tube 2, is driven home thereby gripping the seam or joint 1$^a$, and preventing any relative movement or displacement of the outer and inner tubes 1 and 2, respectively.

In the construction of large heavy tops, such for exapmle,—the "one-man-top" hereinbefore referred to, it is particularly important that the tapered ends of the wooden top bows be driven or forced into the bow receiving ends of the tubular bow sockets with great force in order that a perfectly rigid joint or connection may here occur, and in order to prevent the splitting of the tubular socket at the seam or joint 1ª, as now sometimes occurs, and also to avoid unnecessarily adding to the weight of this portion of the bow socket, I provide an improved reinforcing element or bridge member at this portion of the tubular bow socket shown in some of its embodiments in the drawings and hereinafter described.

The improved reinforcement or bridge member 3, is adapted to be mounted transversely along one side and at the bow receiving end of the tubular bow socket and to extend across the seam or joint 1ª, and may be welded, or otherwise suitably secured, to the walls of the tubular bow socket, preferably by "spot-welding" as indicated at 3ª. As a convenient form for carrying out this welding process said reinforcement or bridge member 3, is preferably cut from a blank as indicated in Fig. 4 of the drawings, so that when formed up as indicated in Fig. 5, inner and outer reinforcing or bridge members 3, are provided, and as a means of holding said inner and outer members in proper relative position for attachment, and more particularly as a means for holding said inner and outer members 3, in proper alinement or registry with each other during the spot-welding operation as illustrated in Fig. 7 of the drawings, the sides of said inner and outer members 3, are connected by means of a connecting web portion 3ª, so that the spot-welding operation may be quickly and properly carried out.

In practice, it has been found that when the bow receiving ends of the tubular bow sockets are provided with these reinforcements applied and spot-welded as shown and described that such bow receiving ends of the tubular bow sockets are given a surprising degree of strength so that it is practically impossible to split them in driving in the wooden bows, and it will be seen that an exceedingly strong light weight tubular bow socket is provided, this great strength being particularly manifest where the inner split member extends to the top of the bow receiving end of the socket and is connected as shown in Figs. 1 and 3 of the drawings. It will be observed also that the bow receiving end of the bow socket is greatly strengthened and that the longitudinally extending seam is prevented from splitting or spreading apart, as likewise the edges 2ª, of the inner split tubular member 2, by reason of the fact that the middle or intermediate spot weld extends through the double seam or joint 1ª, and that the outer spot welds on each side unite the edges 2ª, of the inner tubular member to the walls of the outer tubular member.

From the foregoing description, taken in connection with the accompanying drawings, the operation and advantages of my invention will be readily understood.

Having thus described some of the embodiments of my invention, what I claim and desire to secure by Letters Patent, is,—

1. In a tubular bow socket provided with a longitudinally extending seam, a reinforcing member mounted within the bow receiving end of said bow socket and extending across said seam and welded to said bow socket on opposite sides of said seam.

2. In a tubular bow socket having a longitudinally extending joint, a reinforcing element extending across said joint and spot welded to said bow socket at the bow receiving end thereof, one of said spot welds extending through said joint.

3. A tubular bow socket, comprising inner and outer tubular members provided with a longitudinally extending seam, and inner and outer bridge members welded thereto and connected by a web portion at the ends of said tubular member.

4. A reinforcing element for tubular bow sockets, comprising oppositely disposed curved spaced members connected at one edge by means of a connecting web portion and adapted to be disposed interiorly and exteriorly of the walls of said socket at one end thereof.

5. In a tubular bow socket, the combination with an outer tubular member provided with an inwardly extending longitudinal seam, and an inner split tubular member having its edges abutting against said seam; of spaced reinforcing bridge members welded to and through said inner and outer tubular members and said inwardly extending seam.

6. A tubular bow socket, comprising an outer tubular member provided with a longitudinally extending double seam projecting on the inner side thereof, a reinforcing tubular member having its edges spaced apart and abutting against said seam, and a reinforcing bridge member extending across said seam and welded to said inner and outer tubular members.

In testimony whereof I have affixed my signature in presence of two witnesses.

JAMES CHESTER COSS.

Witnesses:
VICTOR F. McBRIDE,
HARVEY J. COSS.